United States Patent

[11] 3,587,368

| [72] | Inventors | Franz Reiners<br>Berg, Erkelenz-Land;<br>Georg Walk, Rheydt, Germany |
|---|---|---|
| [21] | Appl. No. | 713,723 |
| [22] | Filed | Mar. 18, 1968 |
| [45] | Patented | June 28, 1971 |
| [73] | Assignee | A. Monforts Monchengladbach, Germany |
| [32] | Priority | Mar. 17, 1967 |
| [33] | | Germany |
| [31] | | M73218 |

[54] TURRET LATHE OR LIKE MACHINE
8 Claims, 7 Drawing Figs.

[52] U.S. Cl. ................................................ 82/2.5
[51] Int. Cl. .................................................. B23b 13/02
[50] Field of Search.......................................... 82/2, 2.5,
2.7, 14; 29/41, 568, 382

[56] References Cited
UNITED STATES PATENTS

| 2,922,327 | 1/1960 | Schoepe ...................... | 82/14 |
| 3,267,550 | 8/1966 | Whittum et al. .............. | 29/568 |
| 3,372,450 | 3/1968 | Worrell ........................ | 29/41X |

*Primary Examiner*—Leonidas Vlachos
*Attorneys*—Curt M. Avery, Arthur E. Wilfond, Herbert L. Lerner and Daniel J. Tick ABSTRACT: Turret lathe has a turret beam mounted on a turret shaft and extending transversely thereto. The turret beam carries at least one displaceable slider or carriage formed as a tool or workpiece carrier. The slider is connected to a displacing mechanism carried by the turret beam.

PATENTED JUN28 1971  3,587,368

TURRET LATHE OR LIKE MACHINE

Our invention relates to turret lathes or similar machines.

Lathes of this general type have a stationary frame of generally cubic shape through which a lathe spindle extends and are further provided with a longitudinally displaceable multiarmed turret formed as a tool carrier and extending axially parallel to the lathe spindle, the turret being adjustable by pivoting and capable of being secured in an adjusted position thereof with index pins.

Such tool turrets serve preferably for machining workpieces in the longitudinal direction thereof, i.e. for turning down the workpiece. For performing a facing operation on the workpiece, one or more additional transverse sliders equipped with tools are provided. These sliders are displaceable above, below or laterally from the turret cross or star in the lathe housing. The lathes referred to herein are mainly constructed as automatic lathes, i.e. the operating functions possible with these lathes are performed sequentially after initial adjustment of the lathe; however, it is also possible to perform two or more machining operations thereon simultaneously.

It is an object of our invention to provide a turret lathe which is considerably improved over those known heretofore. More particularly, it is an object of our invention to provide a turret lathe which will permit machining of a workpiece by a turning and facing operation with the same tool.

With the foregoing and other objects in view, we provide in accordance with our invention a turret lathe which differs from the aforedescribed heretofore known turret lathes in that, instead of the conventional multiarmed turret head mounted on the turret shaft there is mounted thereon a transversely extending turret beam with at least one but preferably two or more displaceable and securable sliders or carriages disposed on the turret beam. The sliders are constructed as tool or workpiece carriers or holders and are connected to a displacing mechanism located in or on the turret beam.

In accordance with another feature of our invention, the turret beam is pivotable into a plurality of operating positions and is fixable in these operating positions by rigid guide elements located on the main frame of the lathe.

In accordance with a further especially advantageous feature of the invention, the turret beam is pivotable about an angle of 180° and is provided with at least one slider at the respective upper and lower sides thereof whereby the attributes and operative function of a pair of conventional lathes are imparted to the single lathe of this invention.

In accordance with an additional feature of the invention, we furnish the sliders, that are displaceable on the turret beam, with respective mechanisms for displacing each slider and for fixing it in a given position so that various operative functions can be carried out independently of one another.

In accordance with still another feature of the invention, one of the sliders is constructed as a carrier for a workpiece that has not yet been machined and which is held in readiness thereon for eventual machining. It is thereby possible to employ the turret beam not only as a tool carrier or holder but also as a storage device so that the axial displaceability of the turret beam and the transverse displaceability of the slider can be utilized for interchanging the fully machined workpiece in the lathe chuck and a workpiece that has not as yet been machined.

When the mechanisms for axially displacing the turret beam and for transversely displacing the slider are coupled to one another and are controllable by a duplicating or copying device, in accordance with other features of our invention, there is produced a lathe with which duplicate-forming operations with a template or pattern are possible, it being immaterial whether the lathework is to be inclined, rectilinear or curvilinear.

Moreover, in accordance with the invention, the turret beam can be supplemented with additional revolver arms which are formed as tool and workpiece carriers or holders.

Other features which are considered as characteristic for the invention are set forth in the appended claims.

Although the invention is illustrated and described herein as embodied in turret lathe or like machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein.

Figure 1:
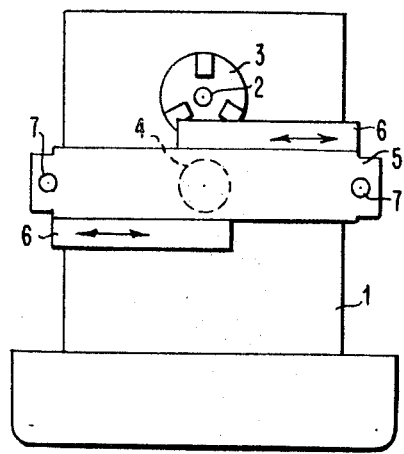
FIG. 1 is a front end view of the turret lathe constructed in accordance with our invention which includes a turret beam whereon two sliders or carriages are displaceable.
Figure 2:
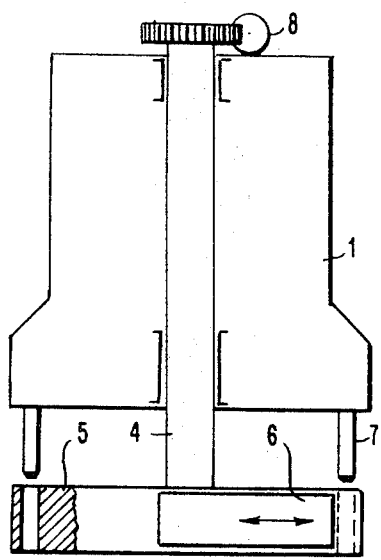
FIG. 2 is a diagrammatic plan view of the turret beam and sliders of FIG. 1 and of the main frame of the lathe of FIG. 1 with the lathe spindle and chuck thereof removed.

Referring now to the drawings and first, particularly, to FIGS. 1 and 2 thereof, there is shown a main machine frame 1 of the turret lathe wherein the operating spindle 2 of the lathe, on which there is mounted a chuck 3 for securing a workpiece that is to be machined, is journaled. The lathe is also provided with a turret shaft 4 journaled in the frame. At the end of the shaft 4 a turret beam 5, provided with two displaceable sliders or carriages 6, is mounted. Index pins 7 are also provided on the lathe for securing the turret beam 5 in either the position shown in FIG. 1 or in the position wherein the turret beam is rotated through an angle of 180°.

In FIG. 2 there is shown the drive mechanism 8 for pivoting the turret beam 5 which includes, for example, a gear transmission for rotating the turret shaft 4 driven by a nonillustrated motor, for example. The shaft 4 of the turret beam 5 is axially movable for inserting the pins 7 into suitable bores provided in the turret beam 5. The drive mechanism for axially moving the shaft 4 is not shown in FIG. 2 since it can be effected in various different ways clearly known to the man of ordinary skill in the art, the illustration of which in the FIG. would only tend to obliterate other detail and unduly complicate the illustration thereof. For the most part, the longitudinal displacement of the turret beam shaft 4 is effected by known hydraulic means.

Figure 3A:
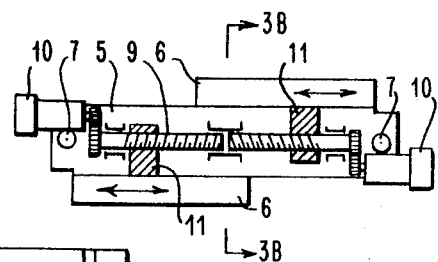
FIG. 3A is a longitudinal partly sectional view of the turret beam of FIGS. 1 and 2 and diagrammatically showing the drive mechanism for the sliders thereof.

The displacement mechanism for the two sliders or carriages 6 on the turret beam 5 is shown in FIG. 3. It primarily comprises two threaded spindles 9 driven by respective motors 10 through a gear train associated therewith, and a displaceable nut 11 secured to each of the sliders 6 and threaded on the respective spindle 9. The respective slider 6 and nut 7 are movable together along the respective spindle 9 in alternate directions of the double-headed arrow in accordance with the rotary direction of the respective motor 10.

Figure 3B:
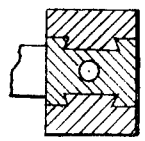
FIG. 3B is a cross-sectional view taken along the line 3B—3B in FIG. 3A.

From the cross-sectional view of FIG. 3B it can be seen that the sliders 6 are slidable in dovetailed guider 12.

Figure 4:
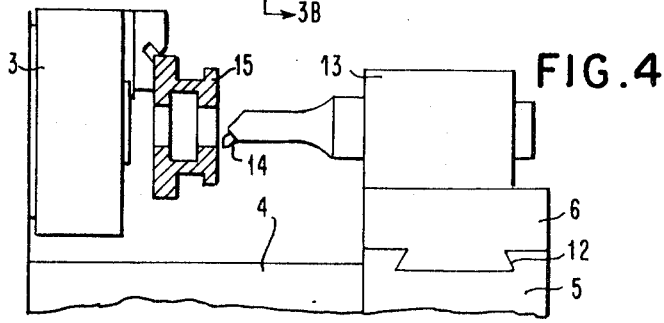
FIG. 4 is an enlarged elevational view, partly in section, of the front end of the turret lathe as seen in FIG. 1 with a workpiece inserted in the lathe chuck and a tool mounted on a slider of the turret beam.
Figure 5:
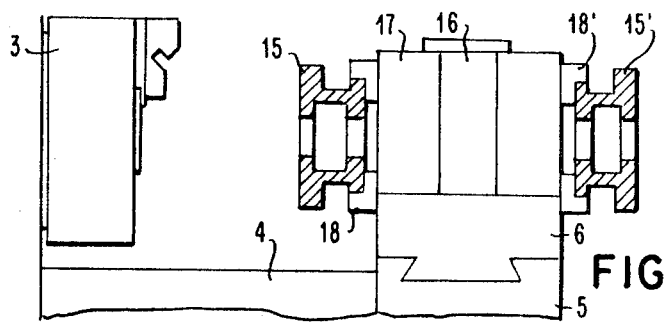
FIG. 5 is a view similar to FIG. 4 of the front end of the turret lathe wherein, instead of a tool, a pivotable workpiece carrier is mounted on the turret-beam slider.

In FIGS. 4 and 5 there are shown the upper half of the turret beam 5 at the end of the lathe located in front of the main lathe frame 1. In FIG. 4, a tool 14 is shown mounted in a holder 13 secured to the slider 6. The tool 14 is adapted to turn down the interior surface of a workpiece 15 suitably secured in the jaws of the chuck 3, as well as to perform a facing operation on the workpiece 15.

In FIG. 5, instead of a toolholder, there is provided a carrier or holder 17 having a pair of chucks 18 and 18' for workpieces 15 and 15' of which the workpiece 15 has already been machined in the lathe and removed from the chuck 3 while the other workpiece 15' has not as yet been machined in the lathe and is to be inserted in the chuck 3 after the carrier 17 is pivoted through an angle of 180° about a pin 16 so that the workpiece 15' assumes the position of the workpiece 15 as viewed in FIG. 5. The chucks 18 and 18' can be operated by hand for tightening and loosening the jaws thereof to clamp a workpiece therein and to remove the same therefrom. Also, the carrier 17 can be turned about the pivot pin 16 by hand. Of course, the tightening and loosening of the jaws of the chucks 18 and 18' and the turning of the carrier 17 can also be effected by mechanical means and, in fact, automatically.

Figure 6:
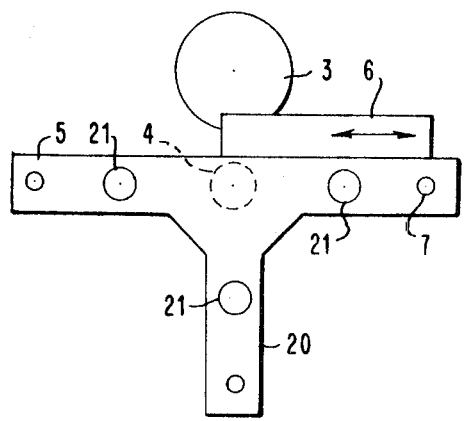
FIG. 6 is a diagrammatic enlarged front end view of the turret lathe of our invention showing a modified revolver beam having an additional arm.

FIG. 6 shows diagrammatically a turret beam 5 according to our invention having only one displaceable slider or carrier 6 which serves as a workpiece carrier. Although the turret beam of FIG. 6 differs from that shown in FIG. 1, for example, by the addition of another arm 20, it should be readily apparent that further modifications of the turret beam can be effected by adding more than one other arm thereto and, accordingly, providing for a correspondingly greater number of positions in which the turret arm can be set relative to the workpiece held by the lathe chuck. At the locations 21, work tools for performing a turning operation in the longitudinal direction of the workpiece can be mounted, whereas tools that are to perform both a longitudinal turning operation as well as a facing operation are mounted on the slider 6 which is displaceable transversely to the longitudinal axis of the workpiece when clamped in the chuck 3 that is mounted at the end of the lathe spindle 2.

The invention of this application encompasses a lathe or the like having only one turret arm and only one slider displaceable thereon as well as a lathe having a plurality of turret arms, one or all of which are provided with one or more sliders for carrying tools or workpieces. The number of operating positions in which the turret beam can be set or adjusted may be relatively great and need not depend upon the position of the index pins, but rather, the lathe can also operate in intermediate angular positions of the turret beam. It is possible, besides, to provide additional guides for the turret in the main frame of the lathe, for example so that the turret is disposed in an inclined position, whereby very accurate machining can be effected even in such a position. Naturally, the lathe constructed in accordance with our invention can be furnished as in the case of other heretofore known lathes, with transverse sliders located on fixed guides in the main lathe frame, which are advantageously suited for turning and facing down a workpiece at the outer periphery thereof as well as at the front and rear sides thereof.

A main advantage of our invention is that by employing relatively simple additional structure, it has been made possible to transversely displace a working tool mounted on the turret beam of a turret lathe so as to permit separate or simultaneous turning and facing of a workpiece with one and the same tool. This improvement has been provided without diminishing in any way the versatility of the heretofore known turret lathes, the large number of operating positions that are afforded when the turret beam is adjusted only a single time, the simplicity and the saving of time provided when the lathe is equipped with tools of the most varied type, and above all the unexcelled great operating accuracy thereof.

It is furthermore a new operating feature of turret lathes constructed in accordance with our invention that facing can be performed therewith in the interior of hollow workpieces, for example machining ring-shaped undercuts therein, as shown in FIG. 4.

A particular advantage of our invention is the avoidance of the formation of withdrawal grooves in the workpieces by the movement of the turret beam into the initial position thereof, since the tool bit can be raised or withdrawn inwardly or outwardly before changing the operating position of the workpiece as soon as the lathe work is ended. By longitudinal and transverse displacements of the revolver and the sliders carrying the working tools, duplicating or tracing lathe work or other material-removing or chip-producing processing or machining operations can be carried out at and inclination, either in a straight line or in curves, if desired. Thus, by means of the turret lathe constructed according to our invention, virtually all conceivable material-removing operations are feasible at every point on a workpiece being formed in a given manner.

We claim:

1. Turret lathe having a main machine frame, a chuck-carrying operating spindle and a turret shaft journaled in the machine frame, said operating spindle and said turret shaft being disposed parallel to and above one another, a turret beam mounted on said turret shaft and extending transversely thereto, said shaft and said beam being displaceable in the axial direction of said shaft, and at least one carriage carried by said turret beam and displaceable in a direction along said turret beam, and displacing mechanism carried by said turret beam and connected to said carriage for displacing the same along said turret beam.

2. Turret lathe according to claim 1, wherein said carriage is in the form of a toolholder.

3. Turret lathe according to claim 1, wherein said carriage is in the form of a workpiece holder.

4. Turret lathe according to claim 1, wherein said turret beam is pivotable about said turret shaft into a plurality of operating positions, and means located on said machine frame for fixing said turret beam in a selected operating position.

5. Turret lathe according to claim 4, wherein said turret beam is substantially horizontal in one of said operating positions thereof, and is provided with at least one upper and one lower carriage as viewed in said substantially horizontal position thereof, said carriages being selectively furnished with tools and workpieces, and said turret beam being pivotable through an angle of 180°.

6. Turret lathe according to claim 1, wherein a plurality of carriages are carried by said turret beam, and including separate devices mounted on said turret beam and connected respectively to each of said displaceable carriages for displacing and adjusting said carriages on said turret beam.

7. Turret lathe according to claim 1, wherein a plurality of carriages are carried by said turret beam, one of said carriages having the structure of a holder for a workpiece held in readiness for machining by the turret lathe whereby, due to the displaceability of said turret beam in the axial direction of the lathe spindle and the displaceability of said one carriage in the longitudinal direction of said turret beam, a workpiece held on said one carriage is exchangeable for a machined workpiece held in the chuck of the lathe spindle.

8. Turret lathe according to claim 1, wherein said turret beam includes a pair of oppositely extending turret arms, and an additional turret arm connected thereto, at least one of said arms being adapted to hold a machining tool and another of said arms to hold a workpiece.